Patented June 13, 1944

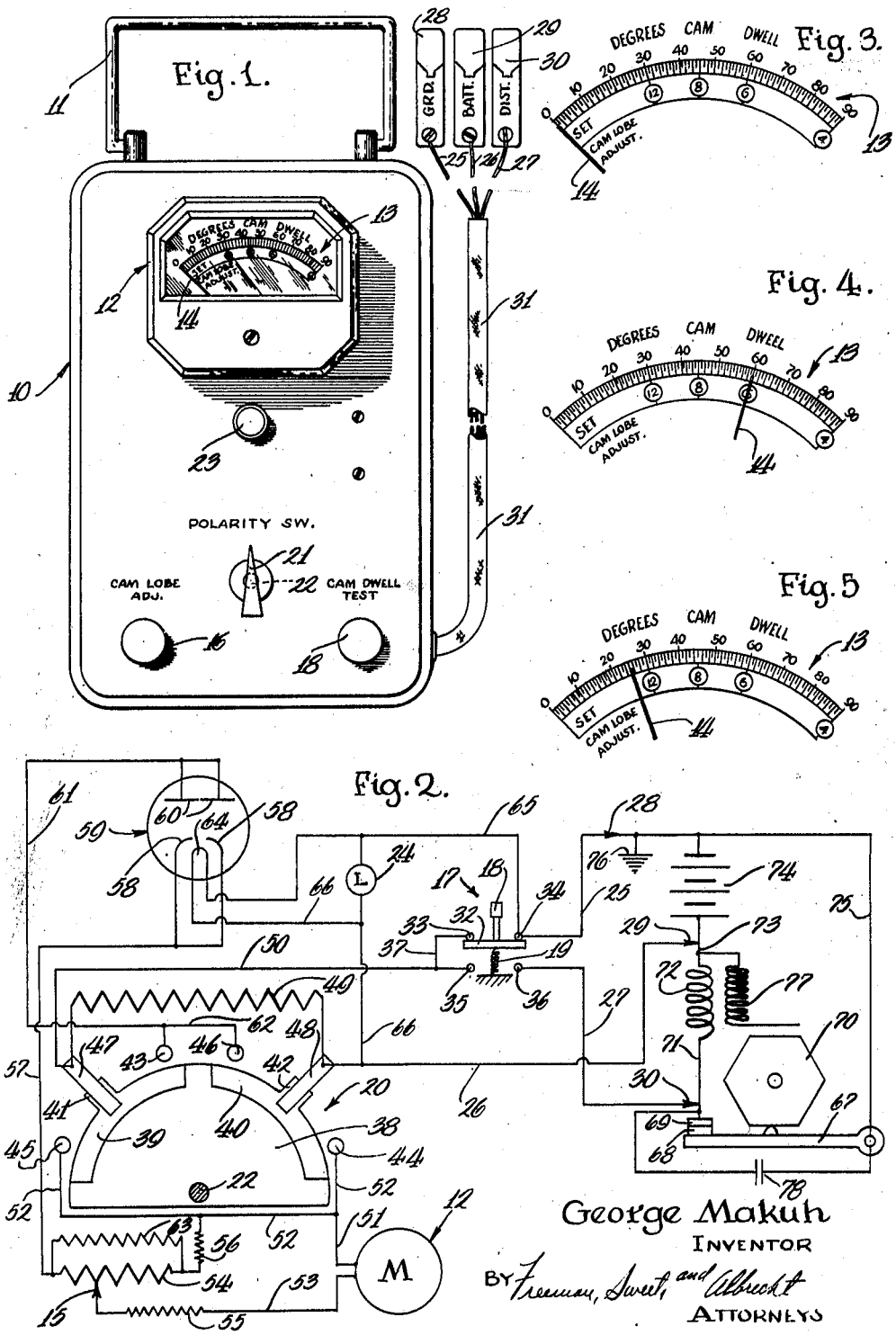

2,351,441

UNITED STATES PATENT OFFICE 2,351,441

ELECTRICAL TESTING

George Makuh, Cleveland, Ohio, assignor to Electric Heat Control Company, Cleveland, Ohio, a corporation of Ohio Application January 27, 1940, Serial No. 315,873

9 Claims. (Cl. 177—311)

The invention relates to electrical testing and particularly to a method and means for testing the breaker means of an ignition system of an internal combustion engine, and, more particularly, it relates to a method and means whereby cam dwell may be determined, that is, during what part of the rotation of the cam of the breaker means the contacts of the breaker means are permitted to be in engagement. The principal object of the invention is the improvement of methods and means of these types.

In the drawing accompanying this specification, and forming a part of this application, there is shown, for purposes of illustration, one embodiment of the invention. In the drawing:

Figure 1 is a plan view of apparatus embodying the invention,

Figure 2 is an electrical circuit diagram of apparatus embodying the invention, which shows also a portion of an ignition system and how the apparatus may be connected to the ignition system to test the latter, and Figures 3, 4, and 5 are enlarged plan views showing the scale of an instrument forming part of the embodiment shown in Figure 1, and showing also the pointer of the instrument in different positions with respect to the scale in the respective views.

The embodiment of the testing apparatus illustrated in the drawing comprises a portable casing 10 which may be provided with a bail 11 whereby the casing can be conveniently hung from a portion of the automotive vehicle the ignition system of which is to be tested.

Carried by the casing 10 is an electroresponsive indicating means or meter 12, the actuating means of which may be of the millivoltmeter type, or any other suitable type of electroresponsive actuating means. The meter 12 is so mounted that its upper side is exposed to view, or at any rate the scale 13 and pointer 14 of the meter are exposed to view. Within the casing 10 is also suitably mounted adjusting means or control means for the meter 12. This adjusting means is for a purpose which will appear, and it includes a movable contact 15 (Figure 2), operable from the exterior of the casing 10 by means of a rotatable knob 16. Near the knob 16 the casing conveniently bears the legend "Cam lobe adj." Within the casing 10 is also suitably mounted a switch 17 (Figure 2) for changing the connections of parts of the electrical system to different test positions, in one of which positions the amount of cam dwell may be read in degrees on the scale 13. The cam dwell test switch 17 is of the push button type provided with a push button 18 which is normally biased upwardly (that is, toward the observer of the plan view of Figure 1) by a spring 19. Near the push button 18 the casing 10 conveniently bears the legend "Cam dwell test." Within the casing is also suitably mounted a reversing or polarity switch 20 (Figure 2) having an operating lever or knob 21 (Figure 1) disposed at the outside of the casing 10. The lever 21 is connected to a shaft 22 extending through the casing 10 to the reversing switch, the shaft 22 being rotatable to two different positions, one clockwise and one counterclockwise, from the "off" position shown in Figure 1. The casing 10 is also provided with a lens 23, behind which, within the casing is suitably mounted an indicating lamp 24 (Figure 2). For convenient connection of the testing apparatus to an ignition system to be tested, three flexible conductors 25, 26, 27 are connected respectively to attaching clamps or connectors 28, 29, 30 adapted for quick connection and disconnection, or of any other suitable form. The clamps 28, 29, 30 are respectively intended for connection to "ground," "battery," and "distributor" of the ignition system and hence respectively bear the legends "Grd," "Batt," and "Dist." The conductors 25, 26, 27 may be constructed and arranged as a single flexible cable 31 where they emerge from the casing 10, and for the desired remainder of their length they are separate.

Referring now to Figure 2, the cam dwell test switch 17 is here shown as comprising a movable contact 32 biased by the spring 19 into engagement with a pair of contacts 33, 34. When the push button 18 is depressed the movable contact 32 is adapted to engage a pair of contacts 35, 36. The contacts 33, 35 are connected by means of a jumper 37, so that in either position of the movable contact 32, one end of the movable contact is electrically connected to the jumper, whereas the other end of the movable contact is connected either to the contact 34 or the contact 36; and it is accordingly apparent that other forms of switches performing the same function may be utilized.

The reversing or polarity switch 20 is here shown as comprising an arcuate insulating member 38 mounted to be rotatable by the rotatable shaft 22. On the insulating member 38 are mounted two arcuate conducting members 39, 40 each of which comprises a respective integral projection 41, 42. The construction and arrangement is such that when the shaft 22 is rotated clockwise to rotate the member 38 to a limiting position, the projection 41 engages a relatively stationary contact 43 and the projection 42 engages a relatively stationary contact 44. On the other hand, if the member 38 is rotated by the shaft 22 in a counterclockwise direction from the position shown in Figure 2, the projection 41 engages a relatively stationary contact 45 and the projection 42 engages a relatively stationary contact 46. The reversing switch 20 is also provided with contacts or brushes 47, 48 with which the arcuate conducting 39, 40 are respectively in sliding engagement, so that in any position of the reversing switch the brushes 47, 48 are in contact with the arcuate conducting members 39, 40 respectively.

A resistor 49 has its terminals connected respectively to the brush contacts 47, 48 of the reversing switch. The contact 47 of the reversing switch is connected by a conductor 50 to the jumper 37. The contact 48 of the reversing switch is connected to the conductor 26 and hence to the clamp 29, this clamp being diagrammatically indicated in Figure 2 by an arrow, the clamps 28, 30 being likewise so indicated.

The meter 12 has one terminal connected, by a conductor 51 and a jumper 52, to the relatively stationary contacts 44, 45 of the reversing switch, and has its other terminal connected by a conductor 53 to the adjustable contact 15 the latter cooperating with a resistor 54. The adjustable contact 15 is movable along the resistor 54 when the knob 16 is rotated. A relatively high resistance 55 may be interposed in the conductor 53. One terminal of the resistor 54 is connected through a resistor 56 to the jumper 52, and hence the meter 12 is adjustably connected in shunt with the resistors 54, 56. The other terminal of the resistor 54 is connected through a conductor 57 to cathodes 58 of a rectifier 59 of the thermionic type, anodes 60 of the rectifier 59 being connected by a conductor 61 to a jumper 62 which connects the relatively stationary contacts 43, 46 of the reversing switch. A rectifier of the thermionic type is preferred because within desired limits the current therethrough will be proportional to the impressed electromotive force. If desired the resistor 54 may have connected in shunt therewith a resistor 63 of suitable resistance to desirably control the fall of potential in the resistor 54. The rectifier 59 is provided with a filament 64 for heating the cathodes 58, one terminal of the filament being connected by a conductor 65 to the contact 34 of the cam dwell test switch 17 and the other terminal being connected by a conductor 66 to the conductor 26. The indicating lamp 24 has its terminals connected to the conductors 65, 66. The conductors 25 and 27 are connected respectively to the contacts 34 and 36 of the cam dwell test switch.

The portion of the ignition system to be tested, shown in Figure 2, comprises a breaker arm 67 carrying a contact 68 which is in engagement with a relatively stationary contact 69 during that portion of the rotation of a cam 70 (driven by the engine, not shown) when the breaker arm is permitted by the cam to dwell in the position in which the contacts 68, 69 are in engagement. For purposes of illustration merely, the cam 70 is here shown as having six lobes. The relatively stationary contact 69 is connected by a conductor 71 to one terminal of a primary 72 of a spark coil, the other terminal of the primary being connected by a conductor 73 to one of the terminals of a battery 74. The other terminal of the battery 74 may be grounded to the frame of the vehicle, as indicated at 76, and conductively connected by the frame, or a conductor 75, to the breaker arm 67. The spark coil is here shown as provided with a secondary 77, one terminal of which is connected to the conductor 73 and the other terminal of which leads to a distributing contact arm (not shown) as is well known in the art. The contacts 68, 69 of the breaker mechanism are shunted by a condenser 78.

When it is desired to test an ignition system of an engine, the system is left intact on the vehicle in completely operative condition, and, with reference to Figure 2, the clamp 28, marked "Grd," is connected to the "ground" of the ignition system, for example to the grounded terminal of the battery 74; the clamp 29, marked "Batt," is connected to the other terminal of the battery 74; and the clamp 30, marked "Dist," is connected to the conductor 71, the latter connection being conveniently made by connecting the clamp 30 to that conducting terminal of the distributor which is connected to the relatively stationary contact 69.

When the foregoing connections have been made, and with the parts as shown in Figures 1 and 2, the pilot lamp 24 will be illuminated, indicating that the filament 64 is receiving energy from the battery 74 and that the resistor 49 is connected in shunt with the battery. The shunt circuit in which the resistor 49 is included is from the terminal of the battery to which the clamp 29 is connected, through the conductor 26, through the resistor 49, through the conductor 50, the jumper 37, the relatively stationary contact 33, the movable contact 32, the relatively stationary contact 34, the conductor 25, to the clamp 28 to the other terminal of the battery. The meter 12 however receives no energy at this time, assuming that the polarity switch is in the position shown in Figures 1 and 2, and consequently the needle 14 of the meter reads 0°, as indicated in Figure 3. The operator may now turn the polarity switch lever 21 clockwise, for example. This causes the projections 41 and 42 to engage the contacts 43, 44 respectively. This connects the left hand terminal of the resistor 49 to the anodes 60 by way of the brush contact 47, the conducting member 39, the projection 41, the contact 43 and the conductor 61, and connects the right hand terminal of the resistor 49 to the cathodes 58 by way of the brush contact 48, the conducting member 40, the projection 42, the contact 44, the jumper 52, resistors 56, 54, 63, and conductor 57. However, if the fall of potential in the resistor 49 is not in the correct direction the rectifier 59 will not permit current flow through resistors 54, 56, 63 and hence the needle 14 of the meter 12 will show no deflection. The direction of fall of potential in resistor 49 will of course depend upon which pole of the battery 74 is grounded. If the needle 14 shows no deflection the operator then turns the lever 21 of the polarity switch counterclockwise so that it occupies its other operative position, whereupon the needle 14 of the meter will be deflected, in a clockwise direction as viewed in the drawing, an amount dependent on the voltage of the battery 74 and the resultant current in the circuit of the electroresponsive operating means of the meter 12. When the lever 21 of the polarity switch is turned counterclockwise, as hereinbefore assumed, the projection 41 will then be in engagement with the contact 45, and the projection 42 will be in engagement with the contact 46. This establishes a circuit in shunt with the resistor 49, from the left hand terminal of the resistor 49, through the brush contact 47, the arcuate conducting member 39, the projection 41, the relatively stationary contact 45, the jumper 52, the resistor 56, the resistors 54, 63 in parallel, the conductor 57, the cathodes 58, the anodes 60, the conductor 61, the jumper 62, the relatively stationary contact 46, the projection 42, the arcuate member 40, the brush contact 48, to the right hand terminal of the resistor 49. It will be evident that since the meter 12 is connected in shunt with the resistors 54, 56 that the amount of current flowing in the meter circuit will be proportional to the fall of potential in the resistors 54, 56 and this fall of potential is in turn dependent upon the fall of potential in the resistor 49.

After the operator has manipulated the polarity switch lever 21 to the proper position to cause a deflection of the needle 14 of the meter 12, he turns the knob 16 for cam lobe adjustment, thereby moving the contact 15 along the resistor 54, in such a direction that, and until, the needle 14 indicates 60°, as shown in Figure 4. The reading of the needle 14 is so adjusted by the cam lobe adjustment knob 16, because, in the instance under consideration, the cam 70 is a six lobe cam and each lobe occupies one-sixth of the entire circumference.

It will be understood that the engine is in operation, and when the foregoing adjustments have been made, the operator depresses the button 18 of the cam dwell test switch, thereby causing the movable contact 32 to engage the contacts 35, 36. The lamp 24 and filament 64 continue to be supplied with current as before, but the aforesaid movement of contact 32 interrupts the connection between the left hand terminal of the resistor 49 to the conductor 25, and, instead, completes a connection from the left hand terminal of the resistor 49 to the conductor 27 and clamp 30. The right hand terminal of the resistor 49 remains connected, through the clamp 29, to one terminal of the primary 72, and since the clamp 30 is connected to the other terminal of the primary 72, operation of the cam dwell test switch 17 connects the resistor 49 in shunt with the primary 72 of the spark coil. Consequently, inasmuch as the engine is operating, current will flow through the primary 72, and through the resistor 49, only when the contacts 68, 69 are permitted to remain in engagement by the cam 70. In view of the previous adjustment of the needle 14 to a deflection of 60° at a time when the resistor 49 is continuously receiving current by reason of being shunted across the battery 74, the needle 14 will now indicate some lesser number of degrees, as shown for example in Figure 5, this number of degrees indicating the number of degrees of rotation of the cam 70 during which it permits the contacts 68, 69 to remain closed per lobe of the cam. If the number of degrees indicated by the needle 14, as in Figure 5, is an unsatisfactory amount, the operator may adjust the breaker mechanism, as, for example, by adjusting the relatively stationary contact 69, again read the meter 12 when the button 18 is depressed, and so on, until the number of degrees cam dwell is satisfactory.

It will be noted that whenever the cam dwell test button 18 is released the resistor 49 is connected in shunt with the battery 74, thereby enabling a quick check on the cam lobe adjustment throughout the testing operations. If at any time during the testing operations it is noted that the needle 14 does not read 60° when the button 18 is released, the cam lobe adjustment knob 16 is manipulated to make it so read.

Connection of the resistor 49 in shunt with the primary 72 will not affect proper operation of the ignition system to maintain the engine running if the resistance of the resistor 49 is suitably chosen. A resistance of 125 ohms has been found satisfactory, but it is not to be understood that the invention is limited to use of that particular value, since any suitable value may be used which will not cause too much current to be shunted away from the primary 72.

It will be evident that but a single scale 13 is necessary to test ignition systems having cam lobes of any usual number. The cam dwell in degrees is readable on this single scale no matter how many lobes the cam may have which is being tested. The scale is desirably so chosen that from 0 to full scale the number of degrees on the scale is equal to 360 divided by the number of lobes on a cam having the lowest number of lobes desired to be tested. In the instance illustrated full scale is 90° and this range is suitable for all practical purposes. As a matter of convenience for operators the scale is provided with numbers 4, 6, 8, and 12, corresponding to the usual numbers of cam lobes, at the number of degrees on the scale 13 respectively equal to 360° divided by 4, 6, 8, and 12. The scale 13 may bear, desirably on the arc in which the numbers 4, 6, 8, and 12 are located, the legend "Set cam lobe adjust.," and all that the operator need remember is to set the cam lobe adjustment knob 18 so that the needle 14 will read 4, 6, 8, or 12, depending upon the number of lobes of the cam of the breaker mechanism being tested. It is of course apparent that these cam lobe numbers on the scale 13 are not essential.

From the foregoing it will be apparent to those skilled in the art that the illustrated embodiment of the invention provides a new and improved method of, and a new and improved means for, electrical testing, and accordingly, accomplishes the principal object of the invention. On the other hand, it also will be obvious to those skilled in the art that the illustrated embodiment of the invention may be variously changed and modified, or features thereof, singly or collectively, embodied in other combinations than those illustrated, without departing from the spirit of the invention, or sacrificing all of the advantages thereof, and that accordingly, the disclosure herein is illustrative only, and the invention is not limited thereto.

I claim:

1. Means for measuring the dwell of the breaker means of an ignition system for an internal combustion engine, said system having a primary circuit connected to a source of current, the parts of said circuit including said breaker means and an induction coil primary in series, comprising: resistor means offering substantially the same resistance to current flow for either direction of current flow therethrough; means for connecting said resistor means directly across one of said parts of said primary circuit; and a measuring circuit connected across said resistor means, said measuring circuit comprising electroresponsive indicating means in series with a rectifier permitting substantial current flow through said electroresponsive indicating means in one direction only.

2. Means for measuring the dwell of the breaker means of an ignition system for an internal combustion engine, said system having a primary circuit connected to a source of current, the parts of said circuit including said breaker means and an induction coil primary in series, comprising: resistor means offering substantially the same resistance to current flow for either direction of current flow therethrough; means for connecting said resistor means directly across said primary coil; and a measuring circuit connected across said resistor means, said measuring circuit comprising electroresponsive indicating means in series with a rectifier permitting substantial current flow through said electroresponsive indicating means in one direction only.

3. Means for measuring the dwell of the breaker means of an ignition system for an internal combustion engine, said system having a primary circuit connected to a source of current, the parts of said circuit including said breaker means and an induction coil primary in series, comprising: resistor means offering substantially the same resistance to current flow for either direction of current flow therethrough; means for connecting said resistor means directly across one of said parts of said primary circuit; and a measuring circuit connected across said resistor means, said measuring circuit comprising electroresponsive indicating means in series with a thermionic rectifier permitting substantial current flow through said electroresponsive indicating means in one direction only.

4. Means for measuring the dwell of the breaker means of an ignition system for an internal combustion engine, said system having a primary circuit connected to a source of current, the parts of said circuit including said breaker means and an induction coil primary in series, comprising: first resistor means offering substantially the same resistance to current flow for either direction of current flow therethrough; means for connecting said first resistor means directly across one of said parts of said primary circuit; and a measuring circuit connected across said first resistor means, said measuring circuit comprising second resistor means, offering substantially the same resistance to current flow for either direction of current flow therethrough, in series with a rectifier permitting substantial current flow through said second resistor means in one direction only, and further comprising electroresponsive indicating means connected across a selected portion of said second resistor means, and means for adjusting the selected amount of said second resistor means across which said electroresponsive indicating means is connected while leaving the resistance to current flow through said measuring circuit substantially unchanged.

5. Means for measuring the dwell of the breaker means of an ignition system for an internal combustion engine, said system having a primary circuit connected to a source of current, the parts of said circuit including said breaker means and an induction coil primary in series, comprising: first resistor means offering substantially the same resistance to current flow for either direction of current flow therethrough; means for connecting said first resistor means directly across said primary coil; and a measuring circuit connected across said first resistor means, said measuring circuit comprising second resistor means, offering substantially the same resistance to current flow for either direction of current flow therethrough, in series with a rectifier permitting substantial current flow through said second resistor means in one direction only, and further comprising electroresponsive indicating means connected across a selected portion of said second resistor means, and means for adjusting the selected amount of said second resistor means across which said electroresponsive indicating means is connected while leaving the resistance to current flow through said measuring circuit substantially unchanged.

6. Means for measuring the dwell of the breaker means of an ignition system for an internal combustion engine, said system having a primary circuit connected to a source of current, the parts of said circuit including said breaker means and an induction coil primary in series, comprising: first resistor means offering substantially the same resistance to current flow for either direction of current flow therethrough; means for connecting said first resistor means directly across one of said parts of said primary circuit; and a measuring circuit connected across said first resistor means, said measuring circuit comprising second resistor means, offering substantially the same resistance to current flow for either direction of current flow therethrough, in series with a thermionic rectifier permitting substantial current flow through said second resistor means in one direction only, and further comprising electroresponsive indicating means connected across a selected portion of said second resistor means.

7. Means for measuring the dwell of the breaker means of an ignition system for an internal combustion engine, said system having a primary circuit connected to a source of current, the parts of said circuit including said breaker means and an induction coil primary in series, comprising: first resistor means offering substantially the same resistance to current flow for either direction of current flow therethrough; means for connecting said first resistor means directly across one of said parts of said primary circuit; and a measuring circuit connected across said first resistor means, said measuring circuit comprising second resistor means, offering substantially the same resistance to current flow for either direction of current flow therethrough, in series with a thermionic rectifier permitting substantial current flow through said second resistor means in one direction only, and further comprising electroresponsive indicating means connected across a selected portion of said second resistor means, and means for adjusting the selected amount of said second resistor means across which said electroresponsive indicating means is connected while leaving the resistance to current flow through said measuring circuit substantially unchanged.

8. Means for measuring the dwell of the breaker means of an ignition system for an internal combustion engine, said system having a primary circuit connected to a source of direct current, the parts of said circuit including said breaker means and an induction coil primary in series, comprising: an instrument having one scale only, said scale being graduated from zero to a number of degrees equal to 360 degrees divided by the number of lobes on a cam having the least number of lobes desired to be tested; said instrument comprising a pointer constructed and arranged to traverse said scale, and comprising electroresponsive means for actuating said pointer; circuit means in which said electroresponsive means is included; connection means for connecting said circuit means across said source of current so as to feed said electroresponsive means with continuous electric current; said circuit means including means for adjusting the flow of said continuous current through said electroresponsive means to cause said pointer to indicate on said scale that number of degrees corresponding to 360 degrees divided by the number of lobes of the cam of the breaker means to be tested whether said cam of the breaker means to be tested has said least number of lobes or a greater number of lobes; and said circuit means including means so constructed and arranged that when said connection means is connected across one of said parts of said primary circuit after the aforesaid adjustment has been made said pointer indicates on said scale the number of degrees per lobe that said cam to be tested permits the contacts of the breaker means to remain in engagement while said breaker means is in operation.

9. Means for measuring the dwell of the breaker means of an ignition system for an internal combustion engine, said system having a primary circuit connected to a source of direct current, the parts of said circuit including said breaker means and an induction coil primary in series, comprising: an instrument having one scale only, said scale being graduated from zero to a highest number of degrees equal to 360 degrees divided by the number of lobes on a cam having the least number of lobes desired to be tested, the graduation mark for said highest number of degrees bearing the same numeral as said highest number and also the same numeral as said least number of lobes, and certain graduation marks of said scale intermediate zero and said highest number bearing numerals respectively the same as numbers of cam lobes greater than said least number of cam lobes said certain graduation marks being in each instance that number of degrees which corresponds to 360 degrees divided by the respective number of cam lobes; said instrument comprising a pointer constructed and arranged to traverse said scale, and comprising electroresponsive means for actuating said pointer; circuit means in which said electroresponsive means is included; connection means for connecting said circuit means across said source of current so as to feed said electroresponsive means with continuous electric current; said circuit means including means for adjusting the flow of said continuous current through said electroresponsive means to cause said pointer to indicate on said scale that graduation bearing the numeral the same as the number of lobes of the cam of the breaker means to be tested whether the cam of the breaker means to be tested has said least number of lobes or a greater number of lobes; and said circuit means including means so constructed and arranged that when said connection means is connected across one of said parts of said primary circuit after the aforesaid adjustment has been made said pointer indicates on said scale the number of degrees per lobe that said cam to be tested permits the contacts of the breaker means to remain in engagement while said breaker means is in operation.

GEORGE MAKUH.